United States Patent
Aggarwal et al.

(10) Patent No.: US 7,379,939 B2
(45) Date of Patent: May 27, 2008

(54) METHODS FOR DYNAMIC CLASSIFICATION OF DATA IN EVOLVING DATA STREAM

(75) Inventors: Charu C. Aggarwal, Ossining, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 10/881,036

(22) Filed: Jun. 30, 2004

(65) Prior Publication Data

US 2006/0004754 A1 Jan. 5, 2006

(51) Int. Cl.
*G06F 7/00* (2006.01)
(52) U.S. Cl. .................. 707/100; 707/101; 707/102
(58) Field of Classification Search ........ 707/7, 707/100–102
See application file for complete search history.

(56) References Cited

U.S. PATENT DOCUMENTS

| | | | |
|---|---|---|---|
| 6,836,773 B2* | 12/2004 | Tamayo et al. | 707/6 |
| 6,941,303 B2* | 9/2005 | Perrizo | 707/6 |
| 2002/0046198 A1* | 4/2002 | Hitt | 706/20 |
| 2003/0040904 A1* | 2/2003 | Whitman et al. | 704/212 |
| 2005/0278322 A1* | 12/2005 | Fan et al. | 707/5 |

OTHER PUBLICATIONS

Hulton et al., "Mining Time-Changing Data Streams", Proceedings of the Seventh ACM SIGKDD International Conference on Knowledge Discovery and Data Mining, 2001.*
B. Babcock et al., "Models and Issues in Data Stream Systems,"ACM PODS Conference, pp. 1-30, 2002.
P. Domingos et al., "Mining High-Speed Data Streams," ACM SIGKDD Conference, 10 pages, 2000.
J. Feigenbaum et al., "Testing and Spot-Checking of Data Streams," ACM SODA Conference, pp. 1-14, 2000.
J. Fong et al., "An Approximate $L^P$-Difference Algorithm for Massive Data Streams," Annual Symposium on Theoretical Aspects in Computer Science (STACS), pp. 193-204, 2000.
J. Gehrke et al., "On Computing Correlated Aggregates Over Continual Data Streams," ACM SIGMOD Conference, 12 pages, 2001.
S. Guha et al., "Clustering Data Streams,"IEEE FOCS Conference, pp. 1-8, 2000.
L. O'Callaghan et al., "Streaming-Data Algorithms for High Quality Clustering," ICDE Conference, pp. 1-25, 2002.
B.-K. Yi et al., "Online Data Mining for Co-Evolving Time Sequences," ICDE Conference, pp. 1-26, 2000.
J.H. Friedman, "Recursive Partitioning Decision Rule for Non-Parametric Classifiers," IEEE Transactions on Computer, C-26, pp. 404-408, 1977.

(Continued)

*Primary Examiner*—Tim Vo
*Assistant Examiner*—Aaron Sanders
(74) *Attorney, Agent, or Firm*—Mark Wardas; Ryan, Mason & Lewis, LLP

(57) ABSTRACT

A technique for classifying data from a test data stream is provided. A stream of training data having class labels is received. One or more class-specific clusters of the training data are determined and stored. At least one test instance of the test data stream is classified using the one or more class-specific clusters.

13 Claims, 3 Drawing Sheets

OTHER PUBLICATIONS

M. Garofalakis et al., "Efficient Algorithms for Constructing Decision Trees with Constraints," KDD Conference, pp. 335-339, 2000.

J. Gehrke et al., "BOAT—Optimistic Decision Tree Construction," ACM SIGMOD Conference Proceedings, pp. 169-180, 1999.

J. Gehrke et al., "Rainforest—A Framework for Fast Decision Tree Construction of Large Datasets," VLDB Conference Proceedings, pp. 127-162, 1998.

G. Hulten et al., "Mining Time-Changing Data Streams," ACM KDD Conference, 10 pages, 2001.

T. Zhang et al., "BIRCH: An Efficient Data Clustering Method for Very Large Databases," ACM SIGMOD Conference, pp. 103-114, Canada, 1996.

* cited by examiner

METHODS FOR DYNAMIC CLASSIFICATION OF DATA IN EVOLVING DATA STREAM

This invention was made with Government support under Contract No.: H98230-04-3-0001 awarded by U.S. Department of Defense. The Government has certain rights in this invention.

FIELD OF THE INVENTION

The present invention is related to techniques for classifying test instances of an evolving test data stream and, more particularly, for adaptively classifying test instances of an evolving test data stream through simultaneous use of a training data stream.

BACKGROUND OF THE INVENTION

In recent years, advances in data storage technology have enabled the storing of data for real time transactions. However, such transactions may produce data that grows without limits, and is commonly referred to as a data stream. There have been recent advances in data stream mining, see, for example, B. Babcock et al., "Models and Issues in Data Stream Systems," ACM PODS Conference, 2002; P. Domingos et al., "Mining High-Speed Data Streams," ACM SIGKDD Conference, 2000; J. Feigenbaum et al., "Testing and Spot-Checking of Data Streams," ACM SODA Conference 2000; J. Fong et al., "An Approximate $L^p$-difference Algorithm for Massive Data Streams," Annual Symposium on Theoretical Aspects in Computer Science, 2000; J. Gehrke et al., "On Computing Correlated Aggregates over Continual Data Streams," ACM SIGMOD Conference, 2001; S. Guha et al., "Clustering Data Streams," IEEE FOCS Conference, 2000; L. O'Callaghan et al., "Streaming-Data Algorithms for High-Quality Clustering," ICDE Conference, 2002; and B-K. Yi et al., "Online Data Mining for Co-Evolving Time Sequences," ICDE Conference, 2000.

An important data mining problem that has been studied in the context of data streams is that of classification, see, for example, R. Duda et al., "Pattern Classification and Scene Analysis," Wiley, New York, 1973; J. H. Friedman, "A Recursive Partitioning Decision Rule for Non-Parametric Classifiers," IEEE Transactions on Computers, C-26, pp. 404-408, 1977; M. Garofalakis et al., "Efficient Algorithms for Constructing Decision Trees with Constraints," KDD Conference, pp. 335-339, 2000; J. Gehrke et al., "BOAT: Optimistic Decision Tree Construction," ACM SIGMOD Conference Proceedings, pp. 169-180, 1999; and J. Gehrke et al., "RainForest: A Framework for Fast Decision Tree Construction of Large Data Sets," VLDB Conference Proceedings, 1998.

Further, research in data stream mining in the context of classification has concentrated on one-pass mining, see, for example, P. Domingos et al., "Mining High-Speed Data Streams," ACM SIGKDD Conference, 2000; and G. Hulten et al., "Mining Time-Changing Data Streams," ACM KDD Conference, 2001.

The nature of the underlying changes in the data stream can impose considerable challenges. Previous attempts at stream classification treat the stream as a one pass mining problem, which does not account for the underlying changes which have occurred in the stream. Often, test instances of different classes within a data stream arrive in small bursts at different times. When a static classification model is used for an evolving test data stream, the accuracy of the underlying classification process is likely to drop suddenly when there is a sudden burst of records belonging to a particular class. A classification model constructed using a smaller history of data is likely to provide better accuracy. On the other hand, if the stream has been relatively stable over time, then using a longer history for training makes greater sense.

Research on time changing data streams having a focus on providing effective methods for incremental updating of the classification model have also been proposed, see, for example, G. Hulten et al., "Mining Time-Changing Data Streams," ACM KDD Conference, 2001. However, since such a model uses the entire history of the data stream, the accuracy of such a model cannot be greater than the best fixed sliding window model on a data stream. Therefore, a more temporally adaptive philosophy is desirable to improve the effectiveness of the underlying algorithms.

SUMMARY OF THE INVENTION

The present invention provides techniques for classifying test instances of a test data stream and, more particularly, techniques for simultaneously using a training data stream for dynamic classification of test instances of the evolving test data stream.

For example, in one aspect of the invention, a technique for classifying data from a test data stream is provided. A stream of training data having class labels is received. One or more class-specific clusters of the training data are determined and stored. At least one test instance of the test data stream is classified using the one or more class-specific clusters.

In an additional aspect of the invention, the test instance is classified by determining a time horizon for optimal test instance classification.

Advantageously, the true behavior of a data stream is captured in a temporal model which is sensitive to the level of evolution of the data stream. The classification process of the present invention provides simultaneous model construction and testing in an environment which evolves over time. A training data stream and test data stream are assumed to be simultaneous in time with the only difference being that the training data stream includes class labels, whereas the testing data stream is unlabelled.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
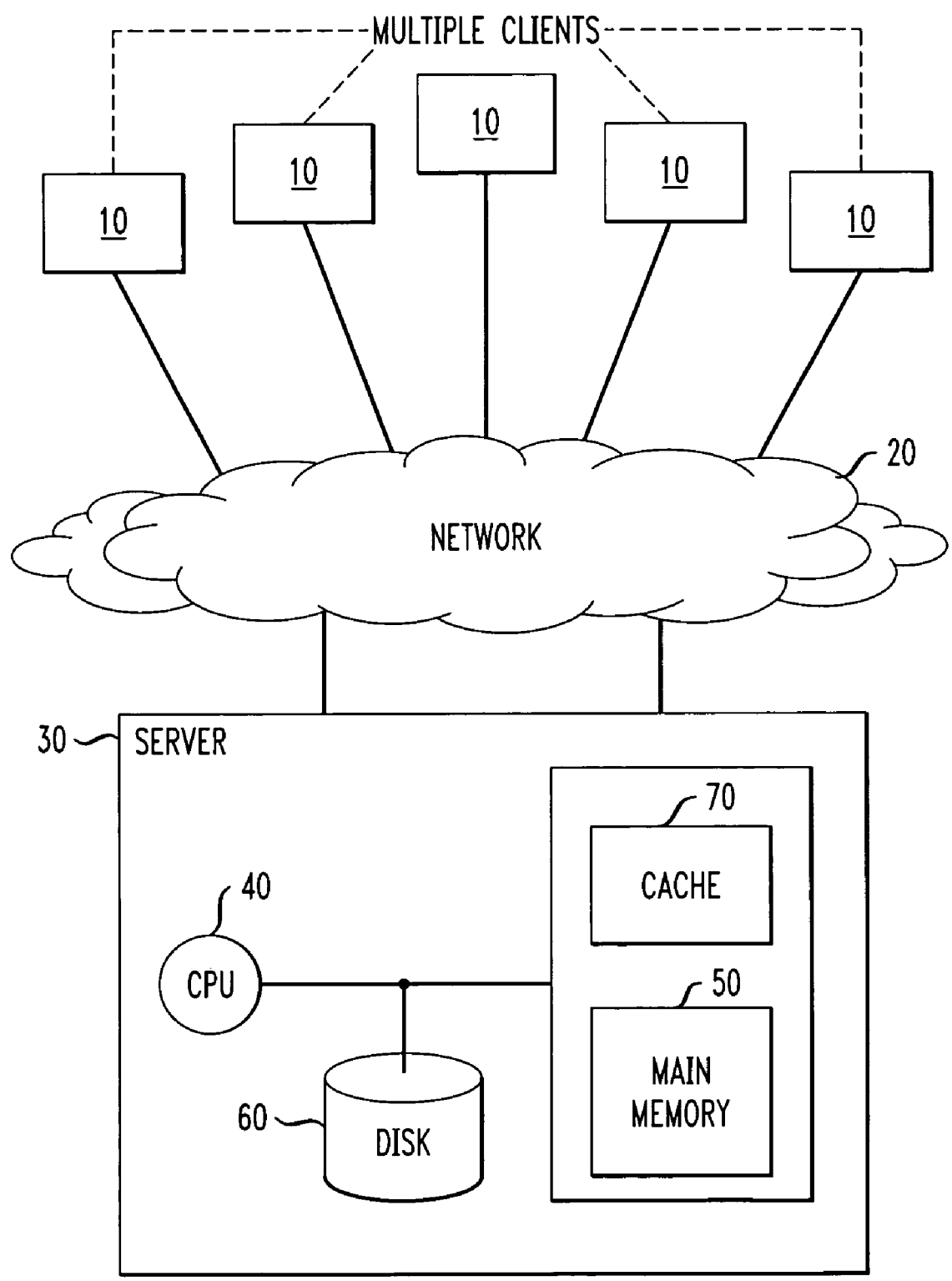
FIG. 1 is a block diagram illustrating a hardware implementation suitable for employing methodologies, according to an embodiment of the present invention.

The following description will illustrate the invention using an exemplary data processing system architecture. It should be understood, however, that the invention is not limited to use with any particular system architecture. The invention is instead more generally applicable to any data processing system in which it is desirable to perform efficient and effective data stream clustering.

As will be illustrated in detail below, the present invention introduces techniques for classifying test instances of an evolving test data stream and, more particularly, techniques for dynamic classification of test instances simultaneously using training and test data streams.

It is assumed that the training and test data streams each consist of a set of multidimensional records $X_1 \ldots X_k \ldots$, arriving at time stamps $T_1 \ldots T_k \ldots$. Each $X_i$ contains d dimensions which are denoted by $X_i=(x_i^1 \ldots x_i^d)$. In addition, each record $X_i$ in the training data stream is associated with a class label $C_i$. The classed of the class $C_i$ is assumed to be i.

As discussed herein, the term "data point" is used to describe a record of a training data stream, while the term "test instance" is used to describe a record of a test data stream. The individual terms are used for purposes of clarity only in order to distinguish which stream the record originated from. However, both terms refer to records of data streams and may be used interchangeably.

An embodiment of the present invention is tailored toward a rapidly evolving data stream. The class structure of the underlying data stream could change quickly during the classification process. For example, a new class which has not been observed in the entire history of the test data stream may emerge because of changes in the underlying process which generates the stream. In such a case, if the entire history of the training data stream is used for classification, the results are likely to be inaccurate. Therefore, it may be desirable to use a smaller and more recent portion of the training data stream for the classification process. Alternatively, a particular class may not have arrived in the test data stream for a long period of time, but may reemerge. In such a case, a well chosen time horizon for the classification process would have a sufficiently long history to include the previous occurrence of the class in the training process. Therefore, mechanisms are needed to make decisions on the suitability of using a time horizon of a given length.

The incoming training data stream is divided into two parts. First, a small portion of the stream is used for time horizon fitting, and is referred to as the time horizon fitting stream segment. The number of points in the data used for this purpose is denoted by $k_{fit}$.

The value of $k_{fit}$ is typically very small such as 1% of the data. Second, the remaining majority of the training data stream is used for accumulation of pertinent statistics corresponding to class information. The present invention utilizes the concept of microclustering, which creates tiny (class-specific) clusters of data that reflect the overall behavior. A weighted nearest neighbor classifier is developed using the microclusters. The microclusters and class statistics may be used in conjunction with the nearest neighbor classifier and a k-means algorithm in order to perform the final data stream classification.

Referring initially to FIG. 1, a block diagram illustrates a hardware implementation suitable for employing methodologies, according to an embodiment of the present invention. As illustrated, an exemplary system comprises multiple client devices 10 coupled via a large network 20 to a server 30. Server 30 may comprise a central processing unit (CPU) 40 coupled to a main memory 50 and a disk 60. Server 30 may also comprise a cache 70 in order to speed up calculations. Multiple clients 10 can interact with server 30 over large network 20. It is to be appreciated that network 20 may be a public information network such as, for example, the Internet or World Wide Web, however, clients 10 and server 20 may alternatively be connected via a private network, a local area network, or some other suitable network.

Records from a data stream are received at server 30 from an individual client 10 and stored on disk 60. All computations on the data stream are performed by CPU 40. The clustered data points and their corresponding statistical data are stored on disk 60, and are utilized for classification purposes.

Figure 2:
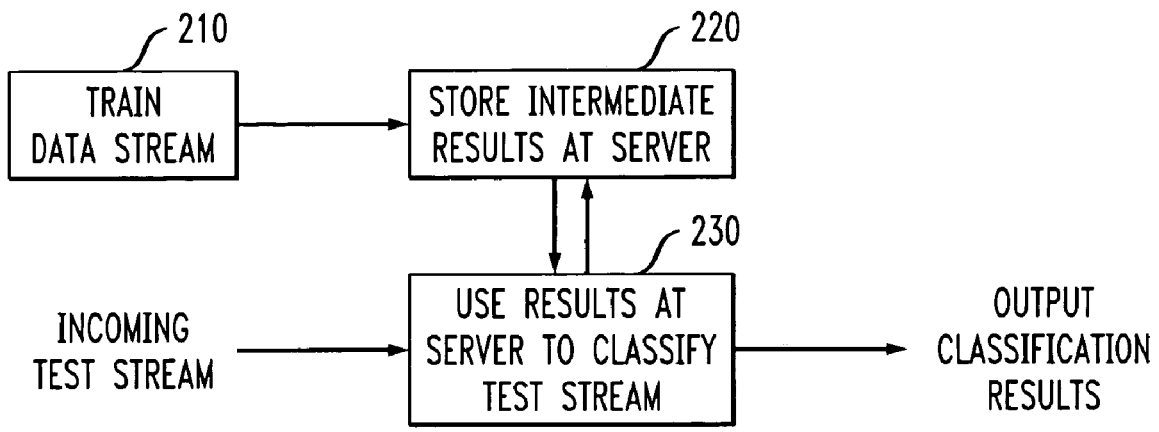
FIG. 2 is a flow diagram illustrating a classification methodology that includes training and test data streams, according to an embodiment of the present invention.

Referring now to FIG. 2, a flow diagram illustrates the overall process for classification of test instances from the evolving test data stream, according to an embodiment of the present invention. As illustrated, there is a clear division of labor between the training data stream and the test data stream. In block 210, a data stream is trained and intermediate results are stored at the server in block 220. The intermediate results stored at the server correspond to statistical parameters about each of the currently maintained clusters in the training data stream, and are referred to as class labeled microclusters. Each class labeled microcluster corresponds to a set of data points from the training data stream, all of which belong to the same class. The intermediate results are used for the classifying process of the test data stream in block 230. More detailed descriptions of blocks 220 and 230 are provided in FIGS. 3-5.

Figure 3:
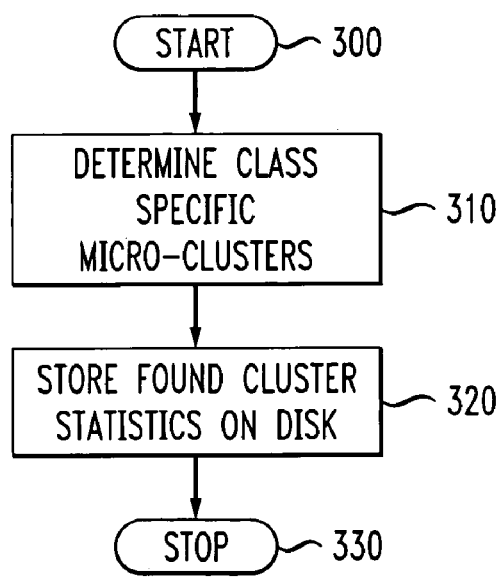
FIG. 3 is a flow diagram illustrating a microcluster storing methodology, according to an embodiment of the present invention.

Referring now to FIG. 3, a flow diagram illustrates a microcluster storing methodology, according to an embodiment of the present invention. This may be considered a detailed description of block 220 of FIG. 2. The methodology begins at block 300. Class-specific microclusters are determined in block 310. In block 320, these microclusters are stored on disk, on a periodic basis. The methodology terminates at block 330.

A microcluster for a set of d-dimensional data points $X_{i_1}, \ldots X_{i_n}$, with time stamps $T_{i_1} \ldots T_{i_n}$ and belonging to the class classid, is defined as the (2. d+4) tuple ($CF2^x$, $CF1^x$, $CF2^t$, $CF1^t$, n, classed), where $CF2^x$ and $CF1^x$ each correspond to a vector of d entries. For each dimension, the sum of the squares of the data values are maintained in $CF2^x$. Thus, $CF2^x$ contains d values, and the p-th entry of $CF2^x$ is equal to $\Sigma_{j=1}^{n}(x_{i_j}^p)^2$. For each dimension, the sum of the data values are maintained in $CF1^x$. Thus, $CF1^x$ contains d values, and the p-th entry of $CF1^x$ is equal to $\Sigma_{j=1}^{n} x_{i_j}^p$. The sum of the squares of the time stamps $T_{i_1}, \ldots T_{i_n}$ are maintained in $CF2^t$. The sum of the time stamps $T_{i_1}, \ldots T_{i_n}$ are maintained in $CF1^t$. The number of data points are maintained in n. The variable corresponding to classed corresponds to the class label of that microcluster.

The above definition of the microcluster for the set of points C is denoted by CFT(C), and is an extension of the cluster feature vector concept, see, for example, T. Zhang et al., "BIRCH: An Efficient Data Clustering Method for Very Large Databases," ACM SIGMOD Conference, 1996. Since each component in the definition of the microcluster is an additive sum over different data points, this data structure can be updated easily over different data streams.

Figure 4:
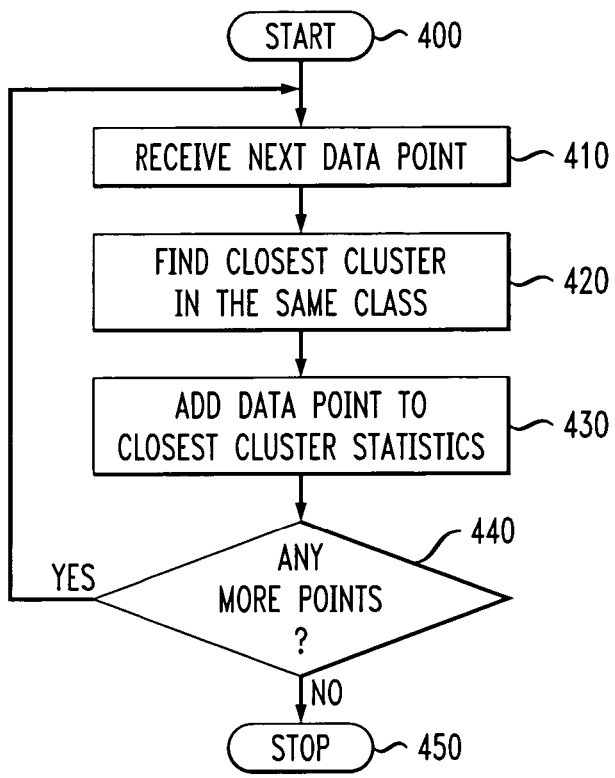
FIG. 4 is a flow diagram illustrating a microcluster maintenance methodology, according to an embodiment of the present invention.

Referring now to FIG. 4, a flow diagram illustrates a microcluster maintenance methodology, according to an embodiment of the present invention. This may be considered a detailed description of block 310 in FIG. 3. The maintenance process uses a simple nearest neighbor clustering methodology. The methodology begins at block 400. At block 410, a data point is received from the training data stream. In block 420, the closest cluster in the same class as this data point is found. The data point is added to the closest cluster in block 430 and corresponding cluster statistics are updated. In some cases, the nearest cluster belonging to the same class does not lie within a predefined threshold. In those cases, a new cluster is created, and an older cluster is deleted. In block 440, it is determined whether any more data points from the training data stream need to be processed. If more data points from the stream need to be processed, the methodology returns to block 410. If there are no more data points from the stream that need to be processed, the methodology terminates at block 450.

The nature of the microclusters and their distribution over different classes may change considerably over time. Therefore, the effectiveness of the classification model may be highly sensitive to the length of the time horizon used for the training process. In general, a time horizon should be used which provides the highest accuracy of the corresponding classification model. This can be achieved by storing the behavior of the microclusters at different moments in time. These stored microcluster states are referred to as snapshots. Such snapshots are stored away (possibly on disk) at particular moments in time, for example at uniform intervals.

Figure 5:
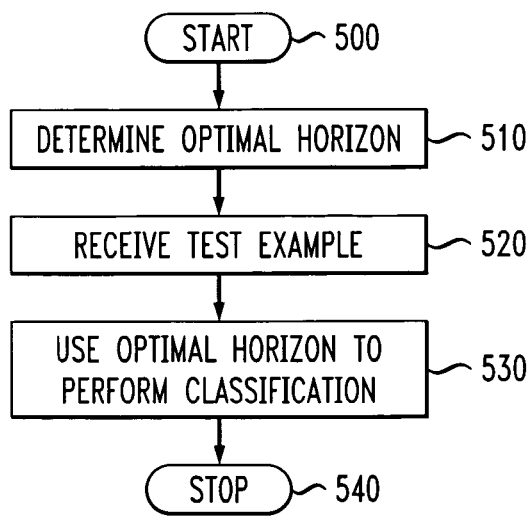
FIG. 5 is a flow diagram illustrating a test instance classification methodology over an optimal time horizon, according to an embodiment of the present invention.

Referring now to FIG. 5, a flow diagram illustrates a test data stream classification methodology, according to an embodiment of the present invention. The methodology begins at block 500. As described above, the key in the classification process is to use microclusters of the training data stream over a specific time horizon.

In block 510 the optimal time horizon is determined. An approximate determination of the microclusters for a particular time horizon is performed using two snapshots. The snapshot of microclusters at time t is denoted by S(t). For example, when the current clock time is $t_c$, a time horizon of length h may be used in order to find the microclusters in the time period $(t_c-h, t_c)$. In such a case, the stored snapshot is found that occurs just before the time $t_c-h$, and referred to as $t_c-h'$. For each microcluster in the current set $S(t_c)$, the corresponding microclusters are found in $S(t_c-h')$, and the CF vectors for these corresponding microclusters are subtracted. The resulting set of microclusters correspond to the time horizon $(t_c-h, t_c)$. This final set of microclusters created from the subtraction process is denoted by $N(t_c, h')$.

The accuracy of the time horizons which are tracked by the geometric time frame are then determined. The p time horizons which provide the greatest dynamic classification accuracy (using the last $k_{fit}$ points) are selected for the classification of the test instance of the test data stream. The corresponding time horizon values are denoted by $H=\{h_1 \ldots h_p\}$. Since $k_{fit}$ represents only a small locality of the points within the current time period $t_c$, it would seem that the system would always pick the smallest possible time horizons in order to maximize the accuracy of classification. However, this is often not the case for evolving data streams. Consider for example, a data stream in which the records for a given class arrive for a brief period, then subsequently start arriving again after a time interval in which records for another class have arrived. In such a case, the time horizon which includes previous occurrences of the same class is likely to provide higher accuracy than shorter time horizons. Thus, such a system dynamically adapts to the most effective time horizon for classification of test instances. In addition, for a stable stream the system is also likely to pick larger time horizons because of the greater accuracy resulting from use of larger data sizes.

Referring back to FIG. 5, data from the test data stream is received in block 520. The classification of test instances in the test data stream is a separate process which is executed continuously throughout the algorithm. In block 530, the optimal time horizon is used to perform classification. For each given test instance $X_i$, the nearest neighbor classification process is applied using each $h_i$ in H. It is often possible that in the case of a rapidly evolving test data stream, different time horizons may report different class labels. The majority class among these p class labels is reported as the relevant class. The methodology terminates at block 540.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A method for classifying data from a test data stream, comprising the steps of:

receiving a stream of training data having class labels, wherein the stream of training data is separate and distinct from the test data stream;

determining one or more class-specific clusters of the training data by adding each data point to a closest class-specific cluster and updating statistics of the class-specific cluster as each data point from the stream of training data is received;

storing the one or more class-specific clusters of the training data on a periodic basis;

classifying at least one test instance of the test data stream using the one or more stored class-specific clusters through the application of a nearest neighbor classification process, in accordance with a determined optimal time horizon that provides greatest dynamic classification accuracy, wherein the optimal time horizon is determined using at least two cluster states of the one or more class-specific clusters of the training data; and outputting one or more classification results of the at least one test instance in the form of at least one class label.

2. The method of claim 1, wherein in the step of determining one or more class-specific clusters, the class-specific clusters comprise class-specific microclusters.

3. The method of claim 1, wherein the step of determining one or more class-specific clusters comprises the step of creating a new cluster when a data point does not fit into an existing cluster.

4. The method of claim 3, wherein the step of determining one or more class-specific clusters comprises the step of removing an existing cluster when a new cluster is created.

5. The method of claim 1, wherein the step of classifying at least one test instances comprises the step of determining a time horizon in accordance with classification accuracy using a portion of data points from the training data stream.

6. The method of claim 1, wherein in the step of determining one or more class-specific clusters, the class-specific clusters track training data stream statistics comprising at least one of sums of data values and sums of squares of data values.

7. Apparatus for classifying data from a test data stream, comprising:

a memory; and at least one processor coupled to the memory and operative to: (i) receive a stream of training data having class labels, wherein the stream of training data is separate and distinct from the test data stream; (ii) determine one or more class-specific clusters of the training data by adding each data point to a closest class-specific cluster and updating statistics of the class-specific cluster as each data point from the stream of training data is received; (iii) store the one or more class-specific clusters of the training data on a periodic basis; (iv) classify at least one test instance of the test data stream using the one or more stored class-specific clusters through the application of a nearest neighbor classification process, in accordance with a determined optimal time horizon that provides greatest dynamic classification accuracy, wherein the optimal time horizon is determined using at least two cluster states of the one or more class-specific clusters of the training data; and (v) output one or more classification results of the at least one test instance in the form of at least one class label.

8. The apparatus of claim 7, wherein in the operation of determining one or more class-specific clusters, the class-specific clusters comprise class-specific microclusters.

9. The apparatus of claim 7, wherein the operation of determining one or more class-specific clusters comprises the operation of creating a new cluster when a data point does not fit into an existing cluster.

10. The apparatus of claim 9, wherein the step of determining one or more class-specific clusters comprises the operation of removing an existing cluster when a new cluster is created.

11. The apparatus of claim 7, wherein the operation of classifying at least one test instances comprises the step of determining a time horizon in accordance with classification accuracy using a portion of data points from the training data stream.

12. The apparatus of claim 7, wherein in the operation of determining one or more class-specific clusters, the class-specific clusters track training data stream statistics comprising at least one of sums of data values and sums of squares of data values.

13. A method for making a computer implemented process to enable classification of data from a test data stream, the method comprising the steps of:

instantiating first computer instructions onto a computer readable medium, the first computer instructions configured to receive a stream of training data having class labels, wherein the stream of training data is separate and distinct from the test data stream;

instantiating second computer instructions onto a computer readable medium, the second computer instructions configured to determine one or more class-specific clusters of the training data by adding each data point to a closest class-specific cluster and updating statistics of the class-specific cluster as each data point from the stream of training data is received;

instantiating third computer instructions onto a computer readable medium, the third computer instructions configured to store the one or more class-specific clusters of the training data on a periodic basis;

instantiating fourth computer instructions onto a computer readable medium, the fourth computer instructions configured to classify at least one test instance of the test data stream using the one or more stored class-specific clusters through the application of a nearest neighbor classification process, in accordance with a determined optimal time horizon that provides greatest dynamic classification accuracy, wherein the optimal time horizon is determined using at least two cluster states of the one or more class-specific clusters of the training data; and instantiating fifth computer instructions onto a computer readable medium, the fifth computer instructions configured to output one or more classification results of the at least one test instance in the form of at least one class label.

* * * * *

UNITED STATES PATENT AND TRADEMARK OFFICE
CERTIFICATE OF CORRECTION

PATENT NO. : 7,379,939 B2
APPLICATION NO. : 10/881036
DATED : May 27, 2008
INVENTOR(S) : Aggarwal et al.

Page 1 of 1

It is certified that error appears in the above-identified patent and that said Letters Patent is hereby corrected as shown below:

In the claims:

Claim 4, col. 6, line 58, delete "anew" and insert --a new--.

Please delete claims 7 through 12, col. 7, line 1 to col. 8, line 3.

Claim 13, col. 8, line 4, delete "13" and insert --7--.

Signed and Sealed this

Sixteenth Day of December, 2008

JON W. DUDAS
*Director of the United States Patent and Trademark Office*